UNITED STATES PATENT OFFICE.

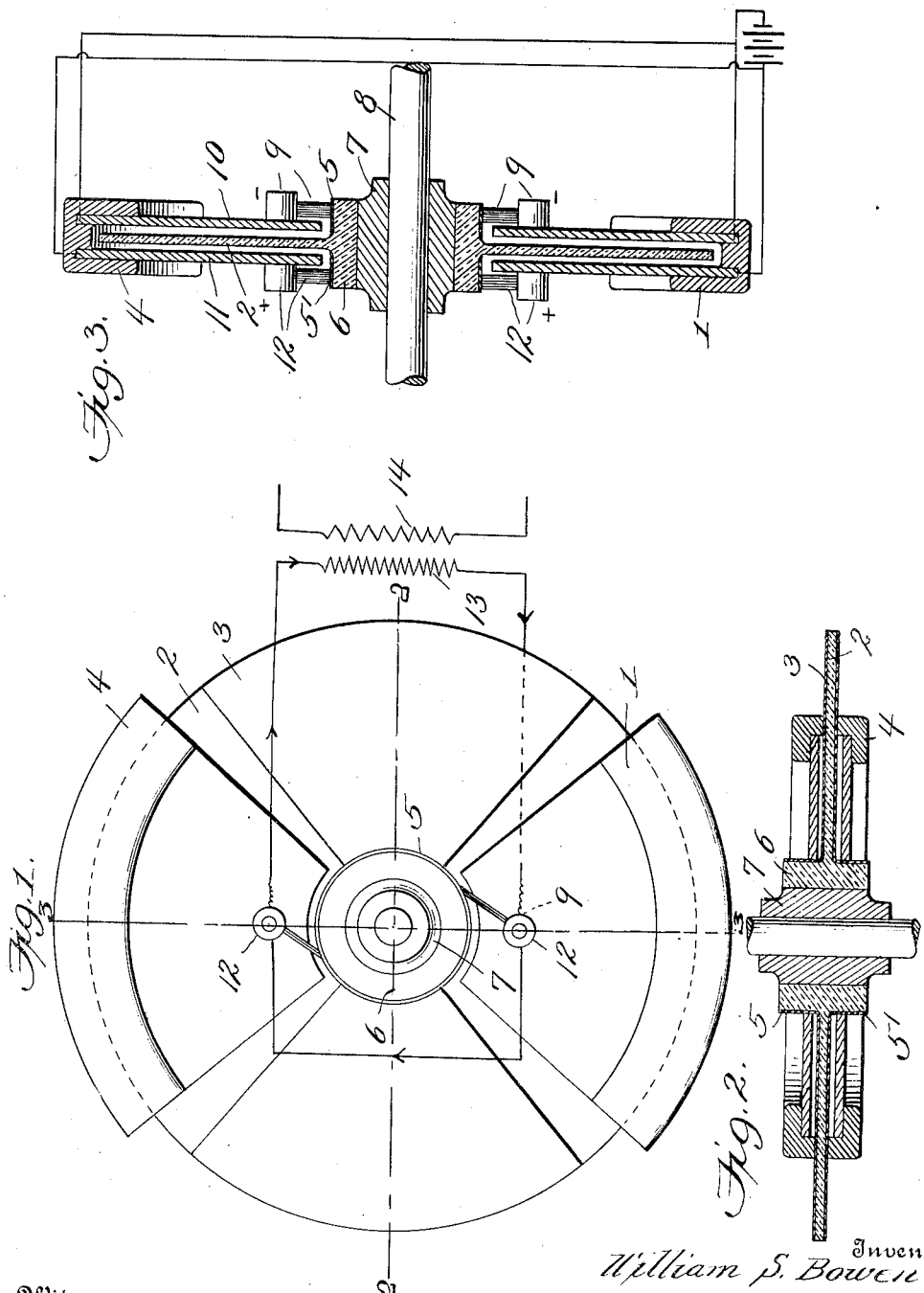

WILLIAM SPENCER BOWEN, OF NEW YORK, N. Y.

ELECTROSTATIC GENERATOR.

1,415,779.   Specification of Letters Patent.   Patented May 9, 1922.

Application filed March 30, 1920. Serial No. 369,890.

*To all whom it may concern:*

Be it known that I, WILLIAM SPENCER BOWEN, a citizen of the United States, residing at New York, in the county of New York, and State of New York, have invented new and useful Improvements in Electrostatic Generators, of which the following is a specification.

My invention relates to improvements in pulsating current generators in which an electro-static field is employed.

The object of my invention is to provide an electro-static generator wherein conductors with an interposed dielectric are mounted to rotate in and out of an electro-static field produced by a stationary condenser. While in the field the rotating conductors develop a charge by induction and when out of the field they lose this charge through the system. Thus an oscillation is set up in the conductors connecting the two sides of the rotating condenser. By passing such a series of impulses through the primary of a transformer an actual alternating current is induced in the secondary.

In the following specification reference is made to the accompanying drawings, in which:—

Figure 1 is an elevation of a simple form of my invention employing a single rotating dielectric plate.

Figure 2 is a sectional view taken on the line 2—2 of Figure 1, and

Figure 3 is a vertical section taken on the line 3—3 of Figure 1, showing diagrammatically the conductive plates of the stationary condenser connected to a source of current.

Throughout the several views of the drawing like numerals represent corresponding parts.

The numeral 1 designates the stationary condensers of my improved generator which are preferably in the form of segments of a circle. The condensers consist of the positive condenser plates 10 and the negative condenser plates 11 supported in spaced relation by the arcuate casings or frames 4 of bakelite or other insulating material. The frames 4 which are stationary may be supported from the enclosing casing of the generator (not shown) in any suitable manner and are placed symmetrically about a rotating shaft 8 so that the condenser plates extend downwardly into the vicinity thereof. One plate of each pair is connected to one pole of a source of current and the other plate of each pair to the other pole of said source.

Interposed between the lower edges of the stationary condenser plates and the shaft 8 is a hub and insulator 7 of bakelite or other insulating material on which the hub 6 of the rotating condenser plate 2 is securely mounted. Since the hub 7 is fastened to the shaft 8, the condenser plate 2 rotates therewith between the spaced positive and negative condenser plates 10, 11.

In segments at diametrically opposite sides of the shaft 8, the rotating condenser plate 2 is provided on opposite faces with segmental conducting plates or conductors 3 which with the dielectric plate 2 form a condenser that rotates between the condenser plates 10 and 11. Sufficient air space is allowed to provide clearance between the rotating condenser and the stationary plates. Figure 1 shows the rotating condensers occupying different quadrants from the stationary condensers and also the preferred relative sizes of the segments. The plates or conductors 3 are connected or secured to the collector rings 5 and 5'. The numerals 9 and 12 represent brushes and brush holders which connect the rings 5 and 5' with the primary 13 of a transformer having the secondary winding 14. The brush holders may be supported on the generator casing (not shown) or on the stationary condenser plates.

Reference is made in this specification to one rotating dielectric plate but my conception of the invention includes a multiplicity of such plates interleaved with rotating conductor plates 3 for the purpose of increasing the capacity of the machine.

The stationary condenser 1 may be charged in any suitable manner as by means of an electro-static machine connected with positive and negative binding posts (not shown) of the condenser.

In operation the rotating condensers will move in and out of the electro-static field produced by the stationary condenser. While in the field the rotating condensers acquire charge by induction and when out of the field, as shown in Figure 1, they lose this charge through brushes 9 and 12 and the primary winding 13 of the transformer since the positive and negative charges tend to rush together to reestablish electrical equilibrium under the new condition. In this manner impulses are set up in the primary winding which connects the two sides of the rotating condenser. A series of such impulses passing through the primary of the transformer induces an actual alternating current in the secondary 14.

The current developed in the primary depends on the capacity of the rotating condenser, its frequency and potential, and the voltage depends on the voltage of the stationary condensers and the width of the air gaps.

I claim:—

1. A pulsating current generator comprising a stationary condenser having spaced plates with a dielectric medium therebetween, a condenser adapted to rotate between said plates and move into and out of the electrostatic field set up in said dielectric and means for electrically connecting the plates on opposite sides of said rotating condenser whereby a pulsating surge of electrical charges is set up in said means.

2. A pulsating current generator comprising a stationary condenser having spaced plates with a dielectric medium therebetween, a condenser adapted to rotate between said plates and move into and out of the electro-static field set up in said dielectric and means for electrically connecting the plates on opposite sides of said rotating condenser, said means including one of the windings of a transformer whereby an alternating current is produced in the other winding thereof.

In testimony whereof I have hereunto set my hand in presence of two subscribing witnesses.

WILLIAM SPENCER BOWEN.

Witnesses:
  HARRIET MONELL ELLER,
  FRANK C. ERB.